July 22, 1958 R. G. SOULE, JR 2,844,644

DETACHABLE SPRING CONTACT DEVICE

Filed Dec. 20, 1956

INVENTOR:
ROBERT G. SOULE, JR.
BY Robert J. Steinmeyer
HIS ATTORNEY

United States Patent Office 2,844,644

Patented July 22, 1958

2,844,644

DETACHABLE SPRING CONTACT DEVICE

Robert G. Soule, Jr., Manlius, N. Y., assignor to General Electric Company, a corporation of New York Application December 20, 1956, Serial No. 629,724

4 Claims. (Cl. 174—35)

This invention relates to a detachable spring contact finger device for ensuring good electrical contact throughout the entire extent of the junction between two elements of an electrical shielding structure.

Spring contact fingers are presently used in many applications where electrical shielding is desired as, for example, between low and high power level radio frequency stages. One specific example of this use occurs where a radio frequency amplifier operated near a receiver radiates sufficient power to cause interference in the receiver. Such an amplifier is normally enclosed in a metallic container having a removable cover which permits servicing the amplifier. Adequate shielding theoretically requires a continuous metal-to-metal contact around the full perimeter of the junction of the cover with the container. Such continuous contact is nearly impossible to achieve in most cases. Therefore some type of spring contact device is normally used to bridge the minute gaps between the cover and the container after the cover is attached.

Spring contact devices of this type have in the past consisted of resilient fingers which are welded, screwed, riveted, soldered, or otherwise permanently attached to either the container or the cover to hold the fingers in place when the container is closed by the cover. Such permanently attached spring contact fingers are not readily added to existing shielding units which either have not previously been equipped with fingers or have had one or more fingers broken in use. Furthermore, such permanently attached fingers are relatively expensive to manufacture. First there is the cost of welding, drilling, riveting or screwing the fingers to the enclosure. Even more important, however, is the fact that such contact fingers must be attached to the enclosure before they can be finished with plating. The handling of the entire assembly during the final plating step frequently leads to manufacturing losses due to finger breakage.

It is therefore an object of this invention to provide a spring contact finger device which overcomes the above noted disadvantages of known devices.

It is a further object of this invention to provide a detachable spring contact finger device which affords an improved metal-to-metal contact and hence affords more adequate shielding by metallic electrical shielding enclosures equipped with the device.

Briefly, in accordance with one aspect of the invention, there is provided a detachable spring contact finger device of generally S-shaped cross-section which may be slipped over the edge of a shielding container before the cover is fastened on. The device is so shaped that when the cover is fastened on, the fingers are held in place by their own pressure, thus affording a plurality of contact surfaces.

While the novel and distinctive features of the invention are particularly pointed out in the appended claims, a more expository treatment of the invention, in principle and detail, together with additional objects and advantages thereof, is afforded by the following description and accompanying drawings of representative embodiments in which:

Figure 1:
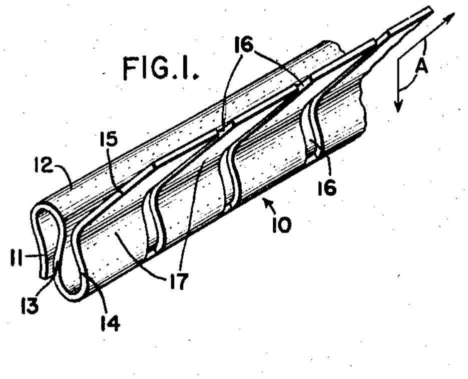
Figure 1 is a perspective view of a detachable spring contact finger device.

Turning now to the drawings, and in particular to Fig. 1 thereof, there is shown a perspective view of a spring contact finger device 10. The device 10 may conveniently be stamped and formed from a continuous sheet of mechanically resilient and electrically conducting material which may, for example, consist of any suitable copper plated metal or alloy. It will of course be understood that the particular kind of material used is not critical so long as it has good mechanical resiliency to afford spring action and good electrical conductivity to afford the desired shielding effect. In practice these two qualities are most readily achieved by plating in known fashion any standard spring metal such as a spring steel or beryllium copper with a good conductor such as silver, gold or cadmium.

Figure 2:
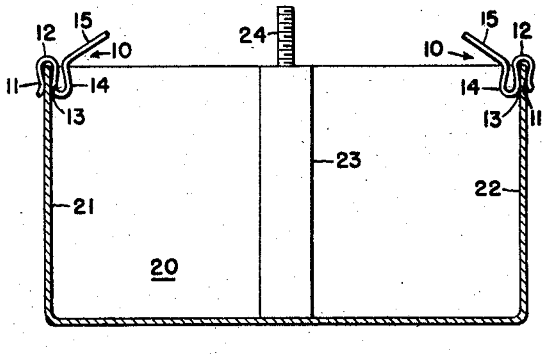
Figure 2 is a cross-sectional view of a shielding container having devices of the type shown in Fig. 1 placed on the edges of the container before the cover is applied.

A first portion of the continuous sheet of material from which spring contact device 10 is made forms a member which has a generally S-shaped cross-section and which includes a first pressure exerting surface 11, a first pressure receiving surface 12, a second pressure exerting surface 13, and a pressure transmitting surface 14. Surfaces 11 and 13 are in generally parallel spaced relationship to each other. These surfaces extend along the length of device 10 and make up those portions of the inner surfaces of the sheet material which are adapted to frictionally engage or contact a shielding enclosure 20 when, as best seen in Figure 2, contact device 10 is slipped over a side such as 21 or 22 thereof. Pressure receiving surface 12, on the other hand, is in generally perpendicular relationship to surfaces 11 and 13. Surface 12 extends along the top of the loop of the S-shaped portion which is adapted to be slipped over the side of the enclosure. As may best be seen in Fig. 3, surface 12 is adapted to be engaged by a cover 25 of the enclosure 20 when the cover is tightened down. The resulting action will be described in more detail below. As noted above, however, surfaces 11, 12, and 13 are simply different portions of the surfaces of the continuous sheet of material which forms one loop of the S-shaped cross-section shown in Fig. 1. Of course, when device 10 is viewed from the opposite end, as is the device 10 shown on side 22 in Figs. 2 and 3, this cross-section will appear as the mirror image of an S rather than as an ordinary S. As will be apparent from the discussion below, however, the action of the device is the same on either side of the box.

The sheet of material which forms surfaces 11, 12, and 13 as described above is extended to form pressure transmitting surface 14 and a second pressure receiving surface 15. Pressure transmitting surface 14 is in generally parallel spaced relationship with pressure exerting surfaces 13 and 11. Surface 13 is disposed between surfaces 11 and 14 in such a fashion that surface 14 completes the periphery of the other loop of the S-shaped cross-section. The sheet material is then extended beyond surface 14 to form the second pressure receiving surface 15. As best shown by the arrows in Fig. 1, surface 15 forms an angle, A, with surface 14 which is preferably between 90° and 180°. Of course, this angle may be made less than 90° to accommodate special cover structures which differ from the cover 25 shown, e. g. by having recessed edges, but in general this angle should be about 135° or at least within the range stated above. Due to this angular relationship it will be noted that surface 15 extends generally above and away from surface 12.

One portion of the sheet forming surface 15 has a plurality of notches 16 therein. These generally parallel notches extend on into the portion forming surface 14 in such fashion that the material between the notches forms a plurality of spring contact fingers 17 as best seen in Fig. 1. Each of these fingers therefore has a first portion containing a pressure transmitting surface 14 and a second portion containing a pressure receiving surface 15.

Turning now to more detailed consideration of Fig. 2, there is shown a metallic shielding enclosure 20 having side walls 21 and 22 and a central spacer or support member 23 from one end of which protrudes a threaded post 24. In practice, a spring contact device, such as device 10 of Fig. 1 is slipped over the top of each side wall of enclosure 20 before the cover 25 is placed on the shielding enclosure. It will be noted that the device 10 of Fig. 1 has a longitudinal axis of symmetry for its S-shaped portion which is a straight line extending generally along the length of surface 13. The device 10 is therefore adapted to be used with a rectangular enclosure having straight edges.

Figure 3:
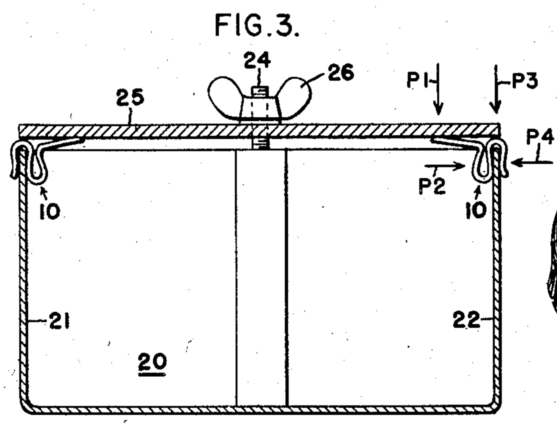
Figure 3 is a cross-sectional view of the assembly similar to Figure 2 but also showing the cover being applied.

As best seen in Fig. 3, cover 25 is next slipped over post 24 and may be held in position by having pressure applied to it by any convenient means such as a wing nut 26. The cover first engages pressure receiving surface 15 of spring contact fingers 17, and tends to bend these fingers downwardly as indicated by the arrow P1 in Fig. 3. The applied pressure is transmitted through pressure transmitting surface 14 to pressure exerting surface 13 which is thereby forced against side 22 of enclosure 20 as indicated by the arrow P2. As cover 25 is forced further downward, spring contact fingers 17 are bent further downwardly until they are flush with or in the same horizontal plane as surface 12. Cover 25 then exerts pressure on surface 12 as indicated by arrow P3. This coacts with the pressure transmitted by surface 14 to cause pressure exerting surface 11 to bear firmly against the outer surface of side 22 as indicated by the arrow P4. The device 10 is thus securely locked in place and affords four contact surfaces with the cover and sides of the shielding enclosure. That is to say, side 22 is contacted by the two continuous surfaces 11 and 13, both of which are exerting pressure on it; whereas cover 25 is contacted by continuous surface 12 and the spring contact fingers 17 comprising surface 15. Both surface 12 and contact fingers 17 are receiving pressure which is applied by the cover and thereby afford two good electrical contacts to the cover of the shielding enclosure.

The fact that two separate contacts are made to both the cover and the side wall of the enclosure affords extra protection against imperfect contact due to minute gaps arising from slight deformities in the surfaces of the enclosure. Separating one of the cover contact surfaces into individual finger contacts further enhances this assurance of good contact. That is to say, although the cover 25 and surface 12 may not mate perfectly along their entire junction due to slight roughness or imperfections in either surface, the individual contact fingers 17 may assume slightly different positions in order to compensate for these slight imperfections and thereby maintain good electrical contact in spite of them.

It is of course apparent that devices such as the device 10 are intended, as shown in Figs. 2 and 3, to be individually applied to each of the side walls of a shielding enclosure having a rectangular cover. If desired, however, similar devices may be initially shaped so as to be adapted for use with enclosures having covers of any other convenient shape. The device 30, shown in Fig. 4, for example, has a circular or curvilinear axis of symmetry and is adapted to be used with a shielding enclosure having a generally circular cover. In this instance a single device may be extended around the entire perimeter of the junction between the cover and the shielding enclosure. In spite of the deformations of its longitudinal axis from a straight line to a circle, the device 30 consists generally of the same parts as does the device 10 of Fig. 1. These corresponding parts of the device 30 are therefore indicated in Fig. 4 by reference characters which correspond in their last digit to the corresponding reference characters applied to the device 10 of Fig. 1. Thus the device 30 has spring contact fingers 37 formed by notches 36 which extend through pressure receiving surface 35 and pressure transmitting surface 34. The rest of the member having the S-shaped cross-section is outlined by pressure exerting surfaces 33 and 31 and by pressure receiving surface 32. In the device 30 the fingers 37 may if desired be tapered in width to narrow toward their outer end. Alternatively, the entire length of notches 15 may be made wide enough so that the contact fingers will not jam together to an extent which would prevent the cover from fully seating. Of course, some tendency for these fingers to be compressed toward each other when the cover is applied is a desirable feature in the device 30 of Fig. 4.

Figure 4:
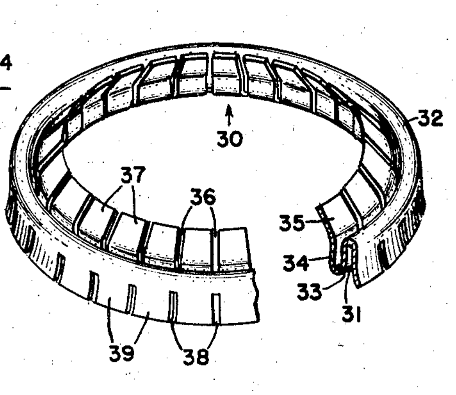
Figure 4 is a perspective view of a modification of the spring contact finger device shown in Figure 1.

In the manufacture of the device 30 the forming operation is preferably carried out by die-drawing a pre-stamped continuous sheet of metal and then annealing the formed device. The die-drawing operation may be facilitated and the device 30 afforded a better spring action if a plurality of slots 38 are stamped out of the material forming pressure exerting surface 31. As shown in Fig. 4, this divides the surface 31 into a plurality of spring contact fingers 39 which function in a manner similar to that of fingers 37.

As will be apparent, both the device 10 and the device 30 have the advantage of being detachable. They may therefore be added to existing shielding enclosures without welding, drilling or soldering and may be readily replaced as a whole if any of the fingers are broken in use. Furthermore, in manufacture both the shielding enclosure and the contact fingers may be completely finished with plating before assembly, thus permitting the assembly of the fingers to the box to be performed as the last operation before fastening on the cover. In practice this results in a considerable reduction of manufacturing losses resulting from breakage of fingers of the type which must be welded, drilled, riveted, or otherwise fastened to an enclosure that must then be handled as an entire assembly for a final plating process. In addition to its convenience and relatively low cost, the detachable spring contact device also affords exceptionally good electrical shielding action due to the fact that it utilizes four rather than two contact surfaces.

While the principles of the invention have now been made clear in an illustrative embodiment, there will be immediately obvious to those skilled in the art many modifications in structure, arrangement, proportions, the elements and components used in the practice of the invention, and otherwise, which are particularly adapted for specific environments and operating requirements, without departing from those principles. The appended claims are, therefore, intended to cover and embrace any such modifications, within the limits only of the true spirit and scope of the invention.

What I claim as new and desire to secure by Letters Patent of the United States is:

1. A detachable spring contact device comprising, first and second pressure exerting surfaces in spaced and generally parallel relationship to each other, a first pressure receiving surface extending between and in generally perpendicular relationship to said first and second pressure exerting surfaces, a pressure transmitting surface in spaced and generally parallel relationship to said second pressure exerting surface; said second pressure exerting surface being disposed between said first pressure exerting surface and said pressure transmitting surface; said first and second pressure exerting surfaces, said first pressure receiving surface and said pressure transmitting surface being formed by a first portion of a continuous sheet of mechanically resilient and electrically conducting material, said first portion of said continuous sheet thereby forming a member having a cross-section which is generally S-shaped, the open loop of said S formed by said first pressure exerting surface, said first pressure receiving surface, and said second pressure exerting surface being adapted to be placed in frictional engagement around a top edge of a side of an electrical shielding receptacle; said continuous sheet of material being further extended from the portion forming said pressure transmitting surface to form a second pressure receiving surface, said second pressure receiving surface forming an angle of greater than 90° and less than 180° with said pressure transmitting surface so as to extend generally away from and above said first pressure receiving surface; said continuous sheet of material having a plurality of parallel notches extending through said second pressure receiving surface and into said pressure transmitting surface to divide said surfaces into a plurality of spring contact fingers adapted to be engaged by the under surface of the cover of said electrical shielding receptacle.

2. Apparatus as in claim 1 wherein said member having a generally S-shaped cross-section has a longitudinal axis of symmetry which is a straight line.

3. Apparatus as in claim 1 wherein said member having a generally S-shaped cross-section has a longitudinal axis of symmetry which is curvilinear, and wherein said material forming first pressure exerting surface is divided into a plurality of contact fingers by a plurality of notches.

4. In combination with a shielding enclosure having at least one wall and a cover, a detachable spring contact device comprising, a member having a generally S-shaped cross-section so as to have a first and second open loop, said member being formed from a continuous sheet of mechanically resilient and electrically conducting material; the material forming opposed sides of said first open loop having two pressure exerting surfaces, said surfaces being positioned in frictional engagement with the inside and outside surfaces respectively of said wall of said enclosure; the material forming said second open loop of said S-shaped cross-section being positioned inside said enclosure; said continuous sheet of mechanically resilient and electrically conducting material being extended from the end of said second loop of said S-shaped cross-section to form a pressure receiving surface; said pressure receiving surface and a portion of said material forming said second loop having a plurality of generally parallel notches therein, the material between said notches forming a plurality of spring contact fingers; said cover being positioned in contact with both said plurality of spring contact fingers and that portion of the material forming said first loop of said S-shaped cross-section which lies directly above the edge of said wall of said enclosure; and means to secure said cover in said position whereby said detachable spring contact device is locked in place and affords a first pair of surfaces contacting the side of said enclosure and a second pair of surfaces contacting the cover of said enclosure.

References Cited in the file of this patent

UNITED STATES PATENTS

| | | |
|---|---|---|
| 1,955,648 | Nickler | Apr. 17, 1934 |
| 2,426,429 | Bels | Aug. 26, 1947 |